United States Patent [19]
Krone

[11] 4,178,252
[45] Dec. 11, 1979

[54] DEVICE FOR SEPARATING PARTICLES FROM A FLUID SUSPENSION AND METHOD FOR SO DOING

[76] Inventor: Ray B. Krone, 645 Coolidge Street, Davis, Calif. 95616

[21] Appl. No.: 938,391

[22] Filed: Aug. 31, 1978

[51] Int. Cl.² ............................................. B01D 21/02
[52] U.S. Cl. .................................................. 210/521
[58] Field of Search ..................... 210/83, 84, 521, 522

[56] References Cited

U.S. PATENT DOCUMENTS

| | | | |
|---|---|---|---|
| 1,231,409 | 6/1917 | Moore | 210/521 |
| 2,413,375 | 12/1946 | Pomeroy | 210/83 X |
| 3,521,756 | 7/1970 | Kaminsky | 210/521 |
| 3,903,000 | 9/1975 | Miura et al. | 210/522 X |

*Primary Examiner*—William A. Cuchlinski, Jr.
*Attorney, Agent, or Firm*—Lothrop & West

[57] ABSTRACT

A device for separating particles from a fluid suspension has a container supplied with fluid containing suspended particles. A plurality of parallel, planar first plates are spaced apart in a direction normal to the plates and are stationarily disposed within the container. Interspersed in the spaces between the first plates is a plurality of second parallel, planar plates movable with respect to the first plates in a circular path and operating to provide limited shearing forces in the fluid and substantially without eddy currents. A discharge pipe receives particles separated by gravity from the sheared fluid between the various plates. In a related form, the plates instead of being planar are circular-cylindrical, spaced apart, and are relatively rotated about a common axis. A method of separating particles from a fluid suspension includes subjecting a fluid containing the particles in suspension to shearing forces without substantial eddy currents so that at least some of the particles separate from each other, or agglomerate, and separate from the fluid itself by gravity.

1 Claim, 3 Drawing Figures

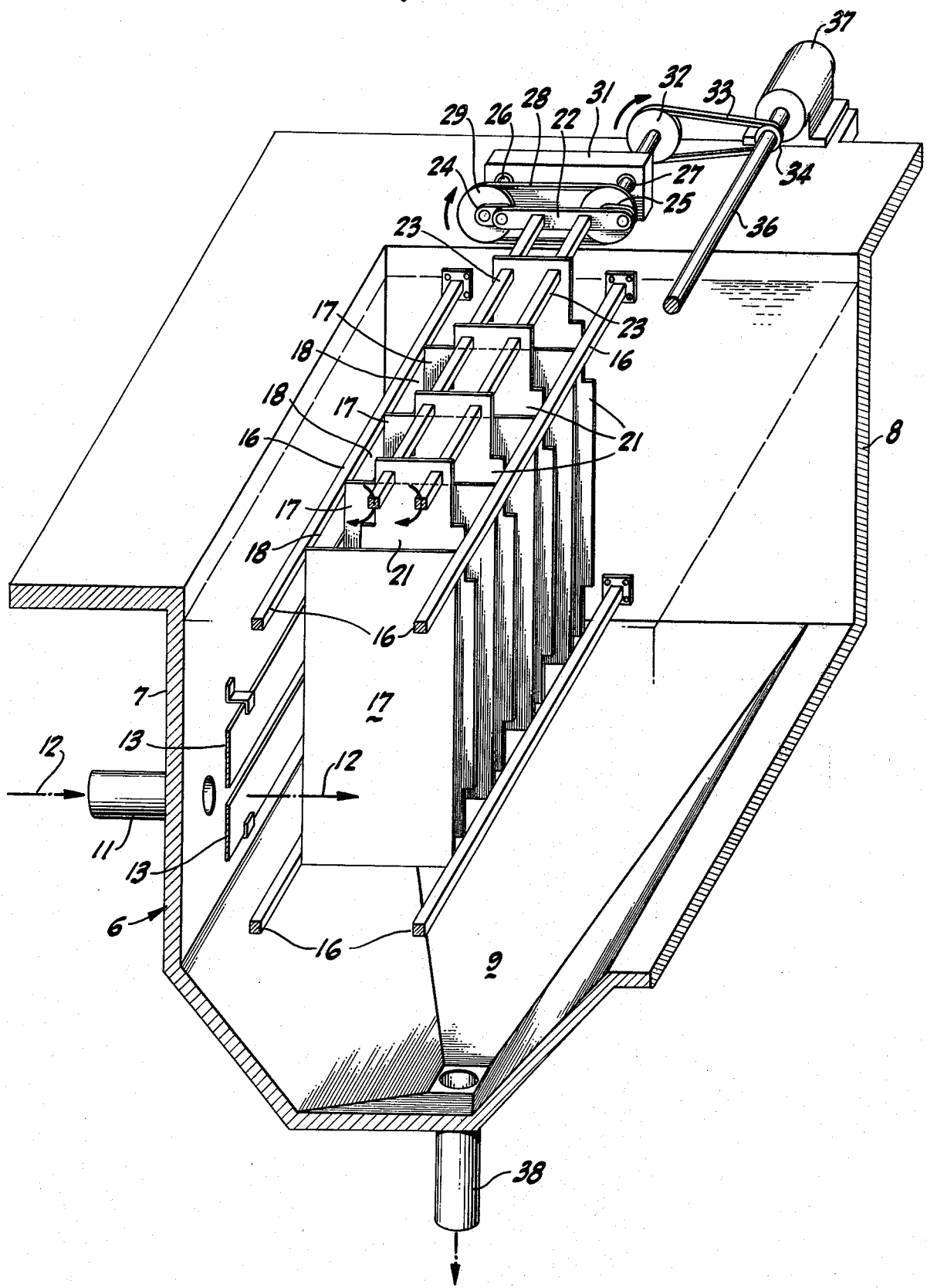
FIG_1

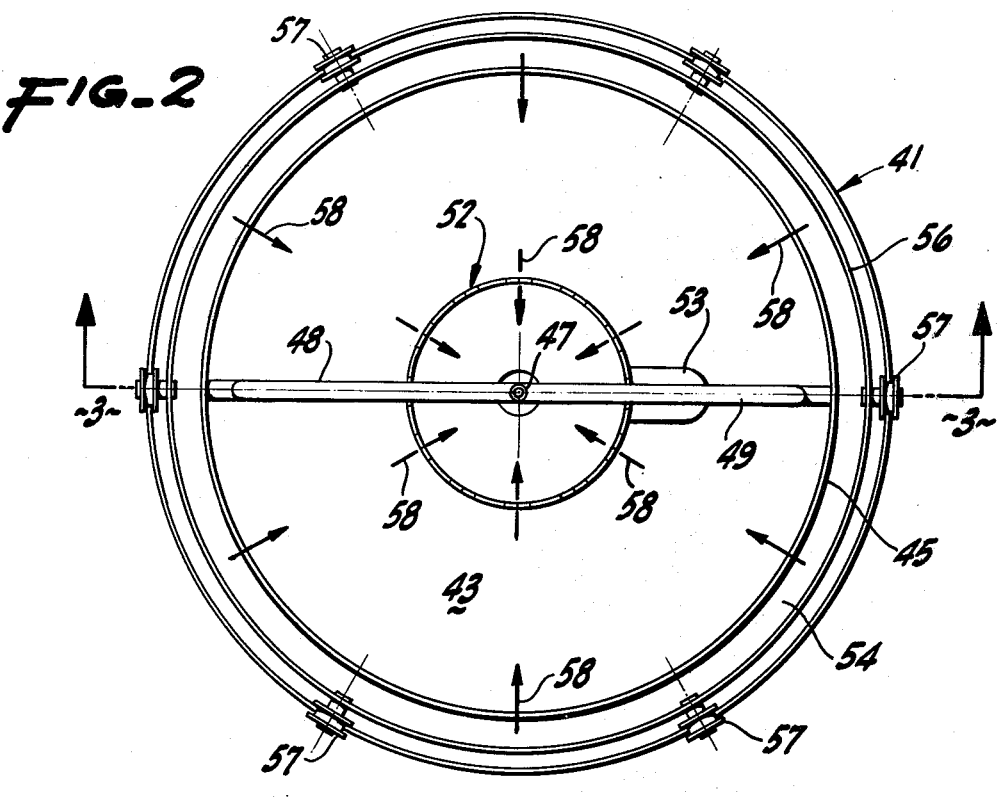
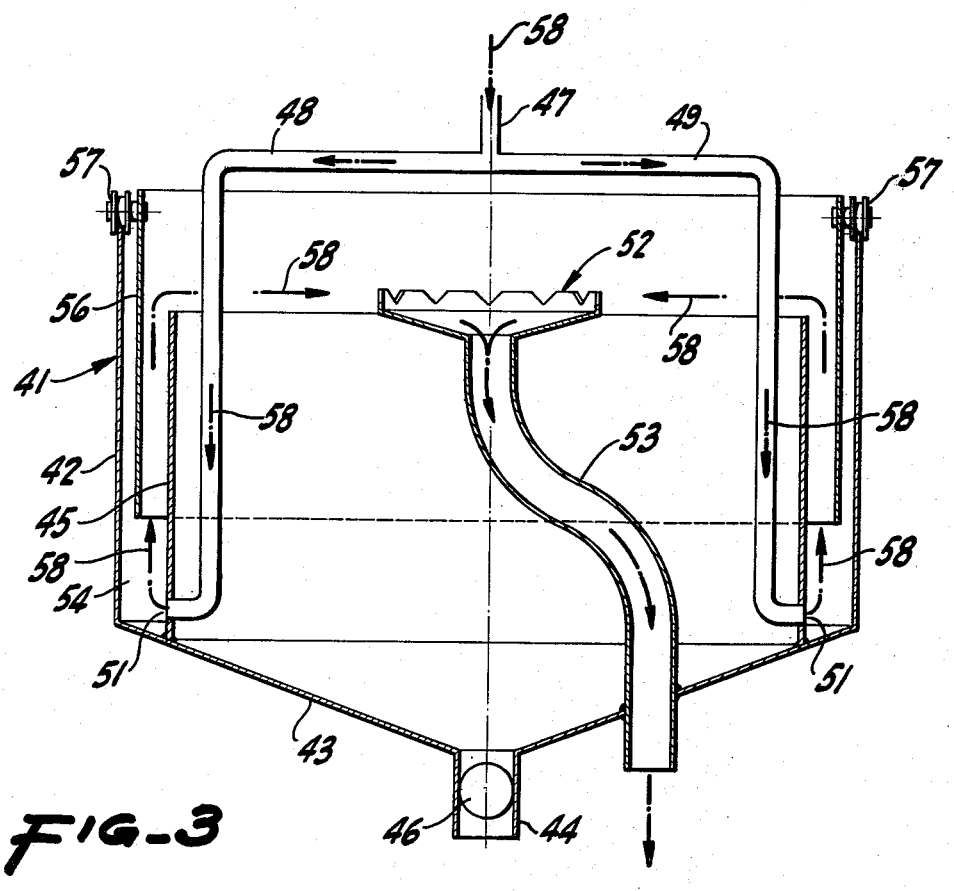

DEVICE FOR SEPARATING PARTICLES FROM A FLUID SUSPENSION AND METHOD FOR SO DOING

BRIEF SUMMARY OF THE INVENTION

It has been observed that particles, especially of solid materials, disposed in a surrounding medium, such as a fluid, tend either to separate from each other or to agglomerate if they are subjected to shearing forces which tend to move them into slightly non-parallel, intersecting paths, also referred to as substantially parallel, provided that they are not also subjected to random eddy currents tending to disperse them. Such forces are engendered by providing stationary, spaced-apart planar plates in a container. Similar, parallel plates are interspersed between the first plates and operated in generally parallel planes and in rotary paths. This produces substantial shearing forces but without engendering any material eddy currents. The particles subjected to that treatment are also acted upon by gravity, which tends to make them fall through the fluid in the event they are heavier than the fluid or to rise through the fluid in the event they are lighter than the fluid. The interspersed plates can in some instances by circular-cylindrical and rotated relative to each other about a common axis. The method of the invention includes affording substantially parallel shearing forces on the particles and the fluid but without any consequential eddy currents, while allowing separation or particle travel by gravity.

BRIEF DESCRIPTION OF THE SEVERAL VIEWS OF THE DRAWING

FIG. 1 is an isometric perspective view showing a portion of one form of an apparatus embodying the invention, the form employing substantially parallel planar plates and a connected driving mechanism.

FIG. 2 is a plan of a modified form of structure in which the plates are circular-cylindrical.

FIG. 3 is a cross-section, in partly diagrammatic form, of the structure illustrated in FIG. 2, the section being on the line 3—3 of FIG. 2.

DETAILED DESCRIPTION

In one embodiment of the invention that is designed to be operated with various different particles suspended in encompassing fluids, particularly liquids, there is provided a container 6 having a side wall 7 and an end wall 8 as well as some converging bottom walls 9. There are corresponding side walls in the generally rectangular container, but these have been removed for better illustration. In practice, the container is substantially symmetrical and is generally rectangular in plan.

Leading into one side of the container, preferably through the wall 7, is an inlet pipe 11 designed to bring in fluid containing particles in suspension therein. The direction of flow of such material from the pipe 11 into the container is in the direction of the arrows 12. In order to distribute such flow within the container 6, the wall 7 acts as a support for a number of baffle plates 13 spaced away from the end of the pipe 11 and serving to direct the flow of material to spread out or generally to advance more slowly in the direction of the arrows 12.

Located within the container and conveniently toward one end thereof adjacent the inlet pipe 11 is a frame 16 made up of a number of parallel bars fastened to the end wall 8 and the complementary end wall at the other end of the structure. Secured to the bars of the frame 16 at spaced intervals is a plurality of first plates 17. These are of a generally planar, rectangular nature, and they are appropriately secured to the respective bars adjacent their four corners and are secured parallel to each other leaving spaces 18 therebetween. Conveniently, the spaced-apart first plates 17 extend almost entirely across the container and parallel in direction to the arrows 12.

Interspersed between the first plates 17 are second plates 21 also planar and generally rectangular and spaced about evenly from the first plates on both sides thereof. The second plates occupy the central portion, generally, of the various spaces 18. The second plates 21 are mounted, at least at the top, on a movable frame 22. They are secured to elongated driving bars 23 fastened to the frame 22 and to a comparable frame (not shown) at the opposite end of the container. The frame 22 (its opposite counterpart is similar) is preferably mounted on parallel cranks 24 and 25 linked together by the frame 22 and extending from parallel shafts 26 and 27, one of which is a driven shaft, and the other of which is a driving shaft.

The shafts 26 and 27 are linked together by a chain 28 engaging sprockets 29 arranged with the cranks in the same phase. The shaft 27 goes through a pillow block 31 and also carries a driven sprocket 32 joined by a chair 33 to a sprocket 34 on a shaft 36 mounted on the container 6 and driven by a motor 37. The shaft 36 continues to the opposite end of the structure, whereat the drive mechanism and the frame mechanism, just described, are duplicated.

At the converging bottom of the container, there is provided a discharge duct 38 that can be controlled by a valve (not shown), if desired.

In the operation of this structure, material coming in through the pipe 11 in the direction of the arrows 12 is deflected somewhat or distributed by the baffles 13, but nevertheless continues generally in the direction of the arrows 12 to flow between the various first plates 17 and the various second plates 21. The plates 17 remain stationary; but when the motor 37 is energized and the frame 22 is operated in a circular orbit, the various second plates 21 are similarly actuated and move with respect to the stationary plates in orbital paths in planes parallel to the plates themselves. This imposes shearing forces at very low angles or only a little non-parallel or substantially parallel on the material between the plates and tends to move the suspended particles, depending largely upon their nature, to agglomerate or adhere or cohere to each other and thus form much larger particles. If the particle nature is different, the particles tend to pull apart from each other and to become substantially lighter because of their smaller volume.

At the same time, the plates are operated relative to each other at speeds that produce shearing forces within a relatively narrow range of values, but are not great enough to induce any substantial eddy currents in the vicinity. This is so that the particles, either agglomerating and falling by gravity toward the bottom 9 or separating and lightening and moving upwardly by gravity toward the open top of the structure, will not after separation or after agglomeration either be again put together or again torn apart by eddy currents.

Once the conditioning of the suspended particles has taken place, it is not disturbed by any substantial eddy currents. Thus, light particles rise and escape from the fluid in the tank by gravity or heavy particles fall to the bottom of the tank, being discharged therefrom, when desired, through the pipe 38.

In order that some space can sometimes be saved and the construction can be somewhat simplified, it is also possible to provide a comparable arrangement, as shown in FIGS. 2 and 3. Herein a container 41 is provided with a circular-cylindrical outer wall 42 that is symmetrical with a central axis and at the bottom is joined to a conical bottom plate 43 leading to a drain pipe 44 with a valve 46 therein.

Upstanding from the bottom plate 43 is a circular-cylindrical first plate 45 also symmetrical with the axis and also stationary with respect to the wall 42, acting as a spaced, first plate, as it is secured firmly to the bottom plate 43. There is an inlet pipe 47 bringing in fluid with particles suspended therein. This material flows onto branch pipes 48 and 49 extending inwardly and downwardly and finally ending with orifices 51 in the lower portions of the first wall 45. Also, there is an overflow weir 52 mounted on the upper end of a discharge pipe 53 likewise passing through and secured to the bottom plate 43.

Disposed in an annular space 54 between the outer wall 42 of the container and the stationary first plate 45 is a second plate 56 arranged at a constant distance from the wall 42 and from the first plate 45. At its upper end the second plate 56 has a number of rollers 57 operating on the upper edge of the wall 42 as a track. Mechanism, not shown, is engaged with and rotates the second wall 56 at a predetermined speed relative to the first wall 45 and to the container wall 42.

In the operation of this device, the driving mechanism is energized to turn the second wall 56 about the axis, the valve 46 is closed, and fluid with particles suspended therein enters in the direction of the arrow 58 into the duct 47 and then flows through the connected pipes 48 and 49 to emerge from the orifices 51. The fluid is directed toward the outer wall 42, which acts as a baffle and deflects such fluid to flow generally in an upward direction.

The fluid is subjected to shearing stresses or forces engendered by the rotation of the second wall 56 relative to the first wall 45 and to the container wall 42; yet the rotation of the wall 56 is moderate so that no substantial eddy currents are generated. The fluid continues to flow generally upwardly and then inwardly to the weir 52. Fluid overflowing into the weir escapes through the pipe 53. Particles conditioned to separate from the fluid by the shear action of the relatively moving walls either fall by gravity and collect in the bottom of the container for ultimate release through the pipe 44 when the valve 46 is open, or rise by gravity and leave the fluid through the open upper portion of the container 41.

In both of these instances the method is employed of subjecting the fluid containing the suspended solid particles to substantial shearing forces that are nearly parallel or only slightly non-parallel in order to make the particles agglomerate, if that is their nature, or to separate, if that is their nature. Gravity acts upon the conditioned particles. Yet the speed of operation is controlled, so that while there is adequate shear force available, there are substantially no eddy currents generated tending to reconstitute the particles after they have been treated by the shear forces.

The net result is that the particulate material in an accompanying fluid can readily be separated therefrom by gravity due to the action of the shear forces imposed and the substantial absence of eddy currents.

I claim:

1. A device for separating particles from a fluid suspension comprising a container having an upright, circular-cylindrical, stationary outer wall with a free upper edge; a conical bottom plate at its peripheral edge united with the bottom edge of said outer wall; an upright, circular-cylindrical stationary inner plate disposed within said outer wall and extending to a predetermined height to leave an annular space therebetween; means for holding the lower edge of said inner plate continuously fastened to the edge of said bottom plate; means including orifices in the lower portion of said inner plate for discharging material into said annular space for upward flow therein; an intermediate plate of circular-cylindrical form disposed in said annular space between said outer wall and said inner plate; rollers on said intermediate plate engaging and movable on said upper edge of said outer wall; a weir substantially centered in the space enclosed by said inner plate and disposed at about said predetermined height; and a discharge pipe joined to and communicating with the interior of said weir and extending downwardly through said bottom plate, said inner plate being movable relative to said outer wall with a substantially constant normal distance between said inner plate and said outer wall.

* * * * *